United States Patent
Brice et al.

(10) Patent No.: US 7,086,855 B2
(45) Date of Patent: Aug. 8, 2006

(54) APPARATUS HAVING IMPROVED WIND RESISTANCE THAT IS A SYNERGISTIC COMBINATION OF A WINDSHIELD AND A BROODER HEATER PILOT ASSEMBLY

(75) Inventors: Martin Brice, Charlotte, NC (US); Frank W. MacIntosh, Mt. Holly, NC (US)

(73) Assignee: Gas-Fired Products, Inc., Charlotte, NC (US)

( * ) Notice: Subject to any disclaimer, the term of this patent is extended or adjusted under 35 U.S.C. 154(b) by 9 days.

(21) Appl. No.: 10/758,823

(22) Filed: Jan. 16, 2004

(65) Prior Publication Data
US 2004/0154551 A1   Aug. 12, 2004

Related U.S. Application Data

(60) Provisional application No. 60/441,071, filed on Jan. 18, 2003.

(51) Int. Cl.
F23D 14/12     (2006.01)
F23Q 9/00      (2006.01)

(52) U.S. Cl. .............. 431/328; 431/285; 431/350; 126/92 B

(58) Field of Classification Search .......... 431/328, 431/326, 285, 278, 350; 126/92 R, 92 AC, 126/92 B, 85 A, 39 E, 39 K; 119/306, 305, 119/307
See application file for complete search history.

(56) References Cited

U.S. PATENT DOCUMENTS

| | | | | |
|---|---|---|---|---|
| 2,745,940 A | * | 5/1956 | Stroh | 119/309 |
| 3,729,287 A | * | 4/1973 | Strashok | 431/278 |
| 3,932,111 A | * | 1/1976 | Liknes et al. | 431/202 |
| 4,120,638 A | * | 10/1978 | Straitz, III | 431/283 |
| 4,128,393 A | * | 12/1978 | Sneed | 431/351 |
| 4,614,166 A | | 9/1986 | Maurice | |

(Continued)

FOREIGN PATENT DOCUMENTS

JP   2003-235375 A   *   8/2003

Primary Examiner—Josiah C. Cocks
(74) Attorney, Agent, or Firm—Dougherty I Clements; Gregory N. Clements

(57) ABSTRACT

The invention is an apparatus that is a synergistic combination of a windshield and a pilot light assembly for a gas burner heater. The apparatus provides reliable operation of the gas burner heater in high air flow conditions, where the air flow would normally cause the pilot light to be extinguished. The windshield, which is a partially perforated tubular chamber, provides a protected zone against high velocity air infusion for the entire pilot light assembly. The apparatus works in concert with the pilot light assembly, which also has components that provide protection from wind and can be quickly removed allowing quick cleaning and easy maintenance. The major components of the pilot light assembly are a pilot light orifice with a flame, a vented pilot housing (stack), a flame deflector cap, a pilot light gas line, a thermocouple with connecting electrical leads, a pilot base, a mounting bracket, and a windshield that surrounds the pilot light and the thermocouple. The flame deflector cap directs the flame toward the thermocouple. There is also a restrictor plate for restricting the flow of updrafts across the thermocouple and directing the flame toward the thermocouple. The invention is particularly useful in poultry brooder heaters, both ceramic and radiant, which are prone to failure as a consequence of the pilot light being blown out by the fresh air being drawn through the chicken house. The apparatus reduces the time to service a brooder.

31 Claims, 8 Drawing Sheets

U.S. PATENT DOCUMENTS 4,919,084 A * 4/1990 Maurice .................... 119/306
5,239,979 A    8/1993 Maurice
5,964,214 A * 10/1999 Ferlin et al. .............. 126/92 B
6,056,540 A *  5/2000 Newman et al. .......... 126/39 E

* cited by examiner

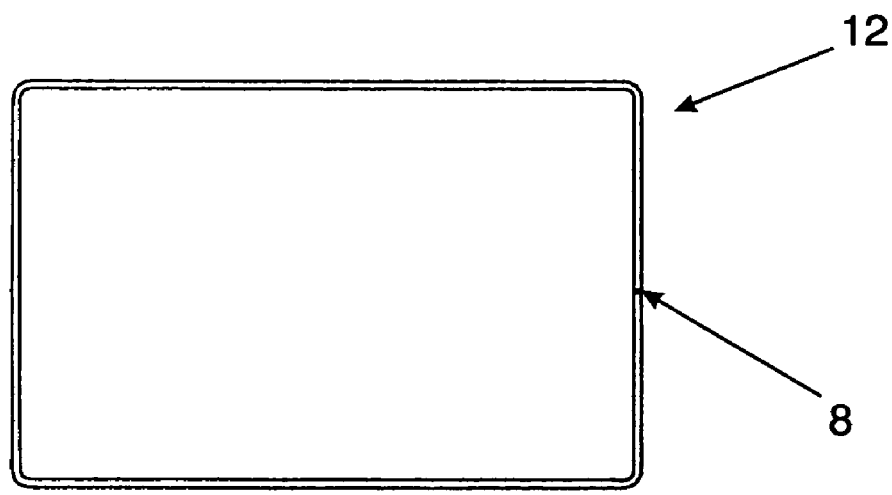
*Fig. 2A*
*Fig. 2B*
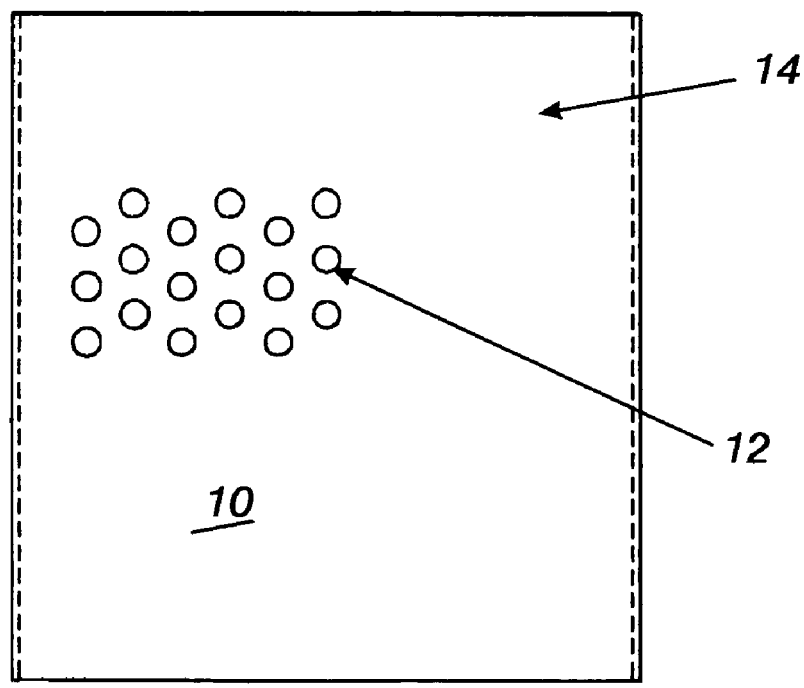

APPARATUS HAVING IMPROVED WIND RESISTANCE THAT IS A SYNERGISTIC COMBINATION OF A WINDSHIELD AND A BROODER HEATER PILOT ASSEMBLY

CROSS REFERENCE TO RELATED APPLICATION

This application claims the benefit of U.S. Provisional Application No. 60/441,071 filed Jan. 18, 2003.

FIELD OF THE INVENTION

The present invention relates to a poultry brooder gas heater having a radiant or ceramic element, and more specifically, to an apparatus which is a synergistic combination of a windshield and an improved pilot light assembly having superior wind resistance.

BACKGROUND OF THE INVENTION

Maintaining proper brooding temperature is critical to effective poultry brooding since temperature variations cause chicks to expend energy to maintain body temperature rather than to increase body weight. Thus, it is desirable to keep the poultry house warm so that the food energy contained in the feed is used to produce weight gain by the bird rather than producing body heat. Furthermore, it is necessary to keep a continuous flow of air through the poultry house to dissipate ammonia that is generated as a waste product by the chickens. A minimum air flow of 3 mph in the poultry house is necessary to prevent chickens from being injured by ambient ammonia in the poultry house. Brooder heaters in the house must operate under air flow conditions sufficient to exhaust the ammonia. It is necessary in some climates to run higher ventilation rates (for example in tunnel houses using evaporative cooling) during the day to assist with cooling, but still need the heat at night when the outside temperature cools. Under these operating conditions the air flow within the poultry house is 7–9 mph. The wind outside the poultry house can also influence the air flow inside the house. Therefore, it is desirable that the heaters operate reliably under a variety of operating conditions. A problem with the current heaters, and in particular poultry brooders having a radiant or ceramic heating element with a gas pilot light, is that when the air flow is above 3 mph there is sufficient flow to either blow the pilot light out or to displace the flame of the pilot light from the thermocouple, such that the thermocouple is cooled, thereby generating a false signal that the pilot light has been blown out. The thermocouple then causes the burner's solenoid gas valve to shut off the gas supply line.

Therefore, what is needed is a brooder heater that can reliably turn on and off over a range of air flow conditions. When off, the pilot light of the pilot assembly reliably stays lit, and the thermocouple accurately detects that the pilot light is burning therein maintaining the gas supply valve actuatable. When turned on, the gas supply line is actuated, the pilot assembly ignites the gas with an acceptable level of flash, the pilot light remains lit, and the thermocouple accurately detects that the pilot light is burning.

A typical brooder chicken house has 15–30 brooder heaters, and after each lot of chickens are grown, approximately 6–8 weeks, the brooder heaters are serviced prior to bringing in the next group of chickens. What is need is a maintenance friendly heater, wherein the pilot light orifice can be easily accessed and cleaned.

SUMMARY OF THE INVENTION

The invention is a windshield that works synergistically in concert with a gas pilot light assembly, which also has components that provide some protection from high air flow; wherein the windshield and pilot light assembly are an apparatus that ensures the dependable operation of a burner, and specifically the reliable operation of a brooder heater burner in high air flow conditions. The pilot assembly, which is mounted proximal to the burner, is comprised of a pilot light; a pilot light orifice; a vented pilot housing (stack) with a flame deflector cap; a pilot light gas line; a thermocouple with connecting electrical leads; a pilot base; a mounting bracket; and a pilot assembly windshield. The vented pilot housing can also have a thermocouple restrictor plate, which shields the thermocouple from updrafts and directs the flame toward the thermocouple. The restrictor plate ensures that the thermocouple is heated, and prevents an errant signal causing the gas supply line to close. The windshield, which is substantially a partially perforated chamber, has an open top and an open bottom, and at least one surrounding side wall that provides a shield against side winds, wherein the at least one surrounding side wall has a section that is partially perforated and a section that is solid, and the chamber is sufficient in size to entirely shields the gas pilot light assembly. The windshield is intersectingly slid onto the mounting bracket, provides a protected zone of air infusion for both the pilot flame and for the thermocouple. The mounting bracket is preferably slotted such that the windshield can be positioned by merely aligning the windshield with the slots on the mounting bracket, and sliding the windshield into the slots, or removed by merely sliding the windshield off the slots. The configuration enables the quick removal and replacement of the windshield. Likewise, the vented pilot housing can be simply lifted off the pilot base, enabling quick access to the pilot light orifice so that it can be easily cleaned. The easy removal of both the windshield and the vented housing reduces the servicing time, and in general results in a maintenance friendly brooder. Another feature of the apparatus is that the windshield need not be removed to ignite the pilot light. The pilot assembly can have either a vertical or a horizontal orientation or any angle in between. The pilot light flame is directed by the flame deflector cap and the restrictor plate so that it is very close or actually impinges the thermocouple.

Both ends of the windshield are open, enabling air to flow vertically with less shielding, while effectively deflecting crosswinds. The combination of the vented pilot housing with the flame deflector cap, restrictor plate, and the windshield produce a synergistic effect, enabling the poultry brooder heater to have superior tolerance to variations in air flow, and ease of cleaning. Furthermore, the apparatus enables the use of a pilot light having small jet orifice, which reduces gas consumption by the pilot light. The invented assembly enables the pilot light to reliably remain lit in air flows of 7–9 mph, and the thermocouple stays sufficiently warm that it does not generate a false signal that the pilot light is extinguished, therein causing the gas to the brooder to be shut off.

The invention can be appropriately sized and combined to accommodate any size heater or bank of heaters, and it is suitable for both ceramic and radiant heaters. Furthermore, the pilot assembly is suitable for all commercial fuels that can be gasified fuels, such as natural gas, propane, butane and kerosene.

It is further anticipated that the apparatus can be used on other types of heaters, in addition to brooders.

OBJECTS OF THE INVENTION

Accordingly, a first object of the present invention is to provide an apparatus for a brooder heater having a ceramic or radiant element, wherein the heater has enhanced operating reliability at higher air flows as compared to heaters fitted with conventional pilot light assemblies.

A second object of the present invention is to provide an improved pilot light assembly for a brooder heater having a ceramic or radiant element, wherein the thermocouple does not incorrectly sense that the pilot light is extinguished.

A third object of the present invention is to provide a windshield for an improved pilot light assembly for the brooder heater, wherein the pilot light is not extinguished at higher air flows as compared to conventional pilot light assemblies.

A fourth object of the present invention is to provide an apparatus for a brooder heater having a ceramic or radiant element, wherein the apparatus provides a maintenance friendly brooder having quick access to the pilot light orifice.

A fifth object of the present invention is to provide an apparatus for a gas fueled heater, wherein one or more pilot light assemblies can be used with various sized heaters.

A sixth object of the present invention is to provide an apparatus, wherein the pilot light assembly can have an orientation that is vertical or angled, such as a horizontal orientation.

A seventh object of the present invention is to provide an apparatus, wherein the pilot light can be ignited without removing the windshield.

An eighth object of the present invention is to provide an apparatus, wherein the pilot light is energy efficient.

BRIEF DESCRIPTION OF THE DRAWINGS

The accompanying drawings, referred to herein and constituting a part hereof, illustrate preferred embodiments of the product of the present invention, and together with the description serve to explain the principles of the invention.

FIG. 2A is an enlarged top view of the windshield as shown in FIG. 1 as part of the poultry brooder according to the present invention.

FIG. 2B is an enlarged side view of the windshield as shown in FIG. 1 as part of the poultry brooder heater according to the present invention.

DETAILED DESCRIPTION OF THE INVENTION

Figure 1:
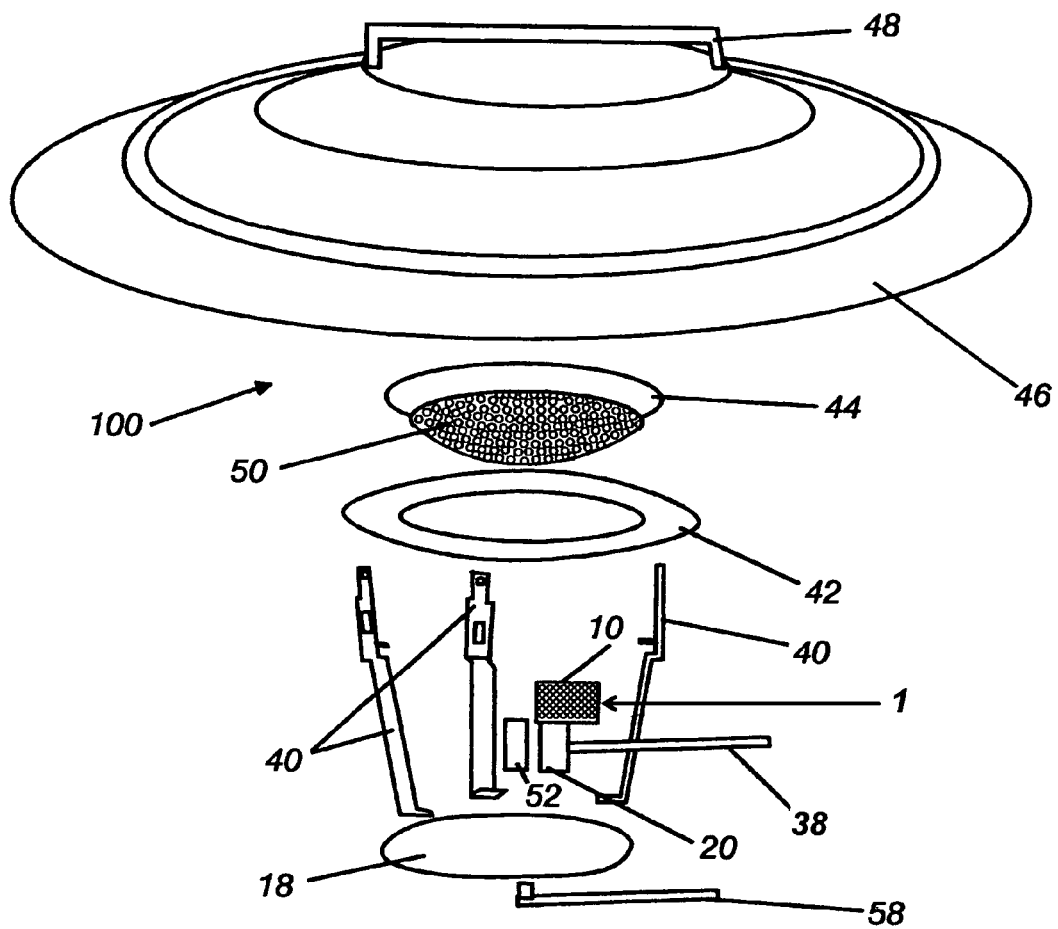
FIG. 1 is an exploded poultry brooder heater having a ceramic element, where the heater is constructed in accordance with the present invention. The apparatus is a synergistic combination of a pilot light assembly and a windshield

Referring now in particular to FIG. 1, there is illustrated a preferred embodiment of the poultry brooder in accordance with the present invention, indicated generally by reference numeral 100. As here embodied, poultry brooder heater 100 includes an inverted conical ceramic element 44 having radiant projections 50 protruding from and substantially covering the bottom surface of the element. The brooder heater 100, preferably, is suspended from overhead by attachment to the hanger 48, which is fitted to reflector 46. The ceramic element is seated on the ceramic holder ring 42. The ceramic holder ring 42 is held by support braces 40, at the point where the support braces have an outboard deflection. The upper end of the support braces 40 are removably mounted on the underside of reflector 46, thereby supporting the ceramic element 44, the holder ring 42, the pilot assembly 20, the burner 52 and the burner pan 18. The burner 52 and the pilot assembly 20 are mounted on the burner pan 18. The invented windshield 10 is seated on the pilot assembly 20. The burner is supplied fuel by the burner supply line 58, and the pilot assembly 20 is supplied gas by the pilot gas line 38.

Figure 3:
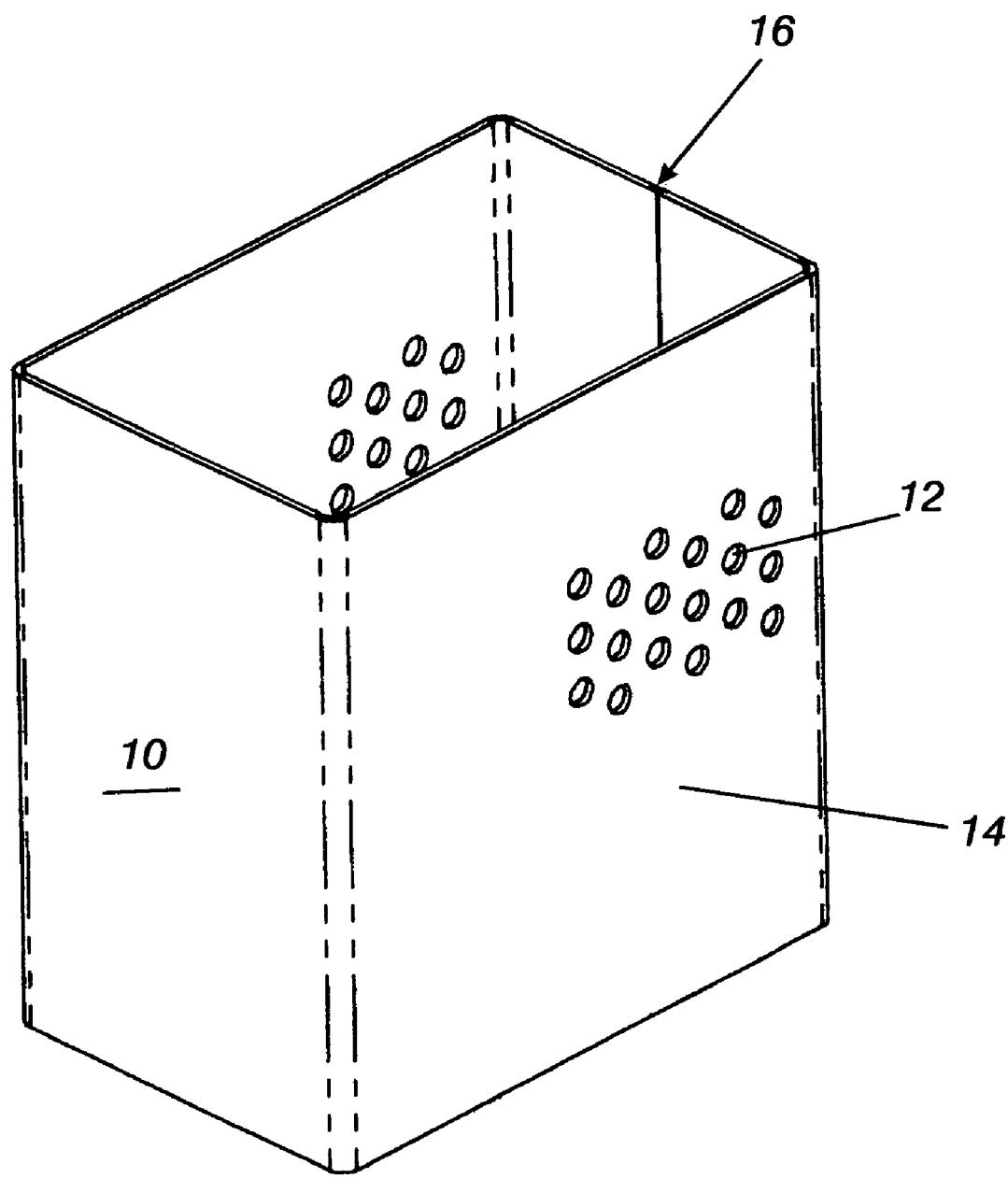
FIG. 3 is an enlarged, isometric view of the windshield.
Figure 6:
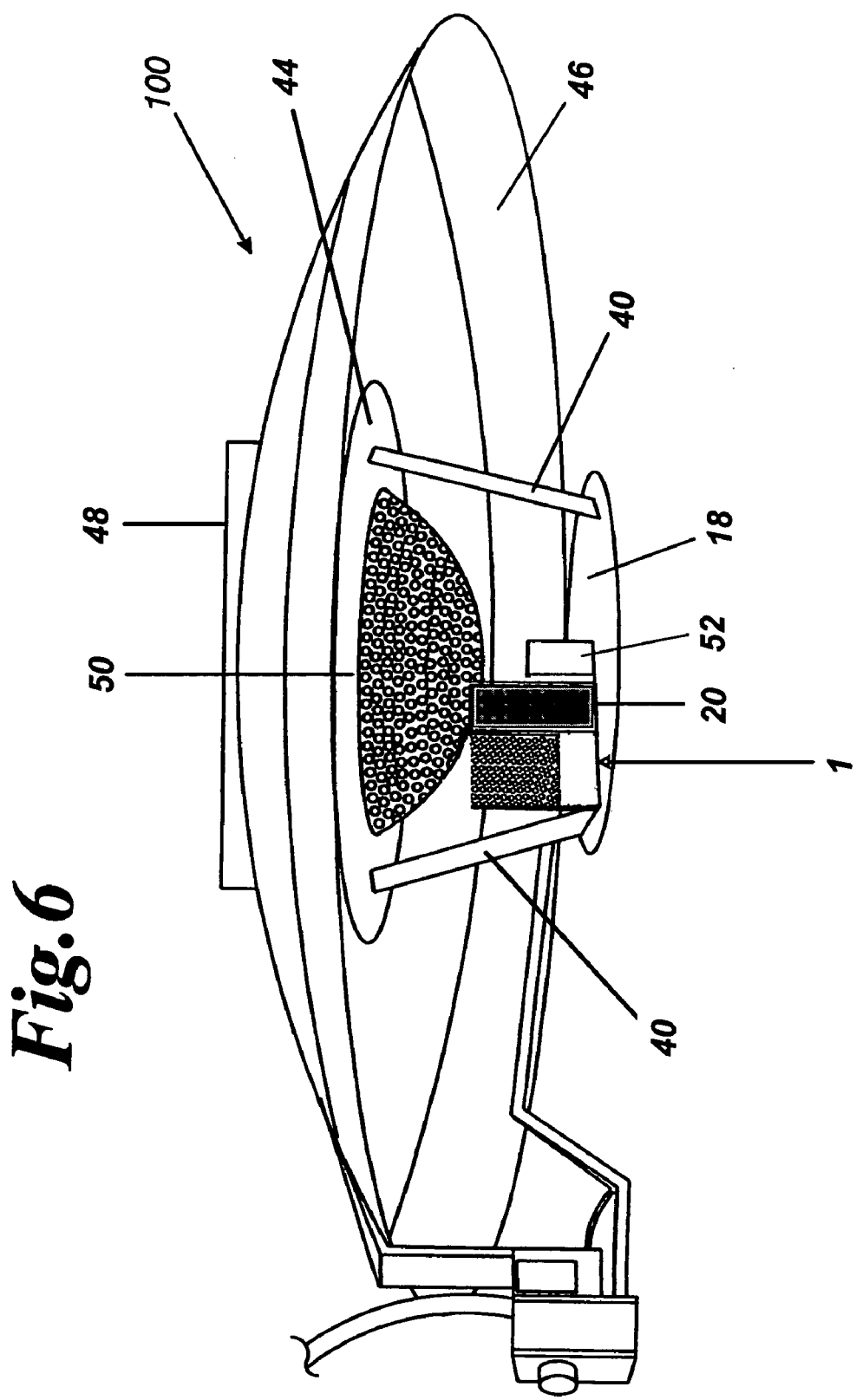
FIG. 6 is a perspective view of the poultry brooder heater having a ceramic element shown in FIG. 1.

A top view of the windshield 10 is shown in FIG. 2A. A side view of the windshield is shown in FIG. 2B. The windshield has a perforated zone 12 and a solid zone 14, where the windshield is not perforated. Preferably the perforated zone 12 extends around the entire periphery, such that the solid zone 14 is only that small area between the holes. The windshield 10 is oriented on the pilot assembly so as to provide deflection of the airflow away from the pilot light flame. As shown in FIG. 6, the burner 52 is positioned directly under the inverted crown of the ceramic element 44. The pilot assembly 20 is mounted near the perimeter of the ceramic element 44. The perforated zone 12 extends around the entire periphery of the windshield 10, as shown in FIG. 6. FIG. 3 is an isometric view of the windshield. The windshield 10 is comprised of stainless steel that is formed into an open ended chamber that is substantially rectangular. A butted joint 16 is on one wall of the windshield 10.

Figure 4:
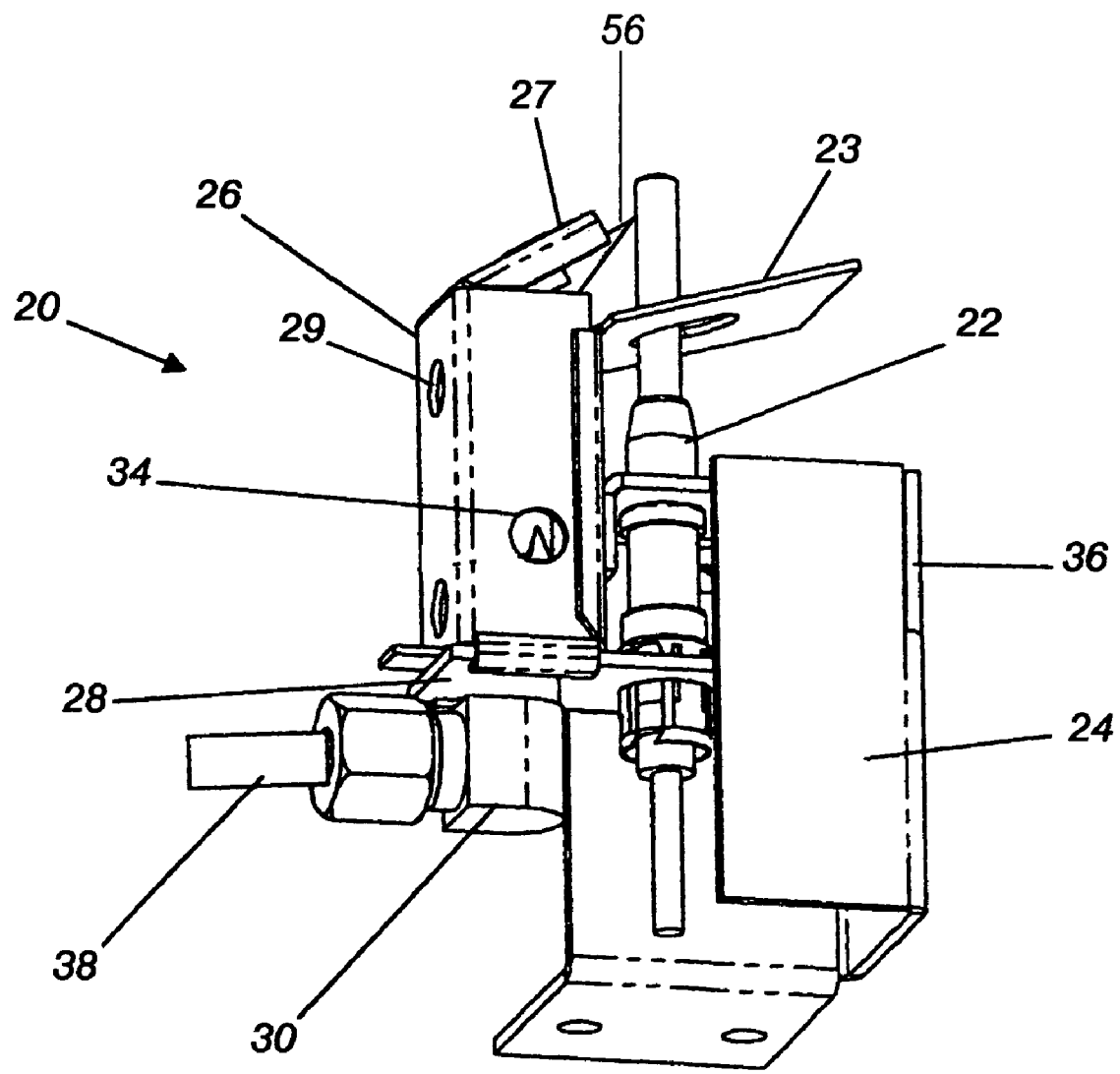
FIG. 4 is an enlarged, isometric view of the pilot light assembly.
Figure 5:
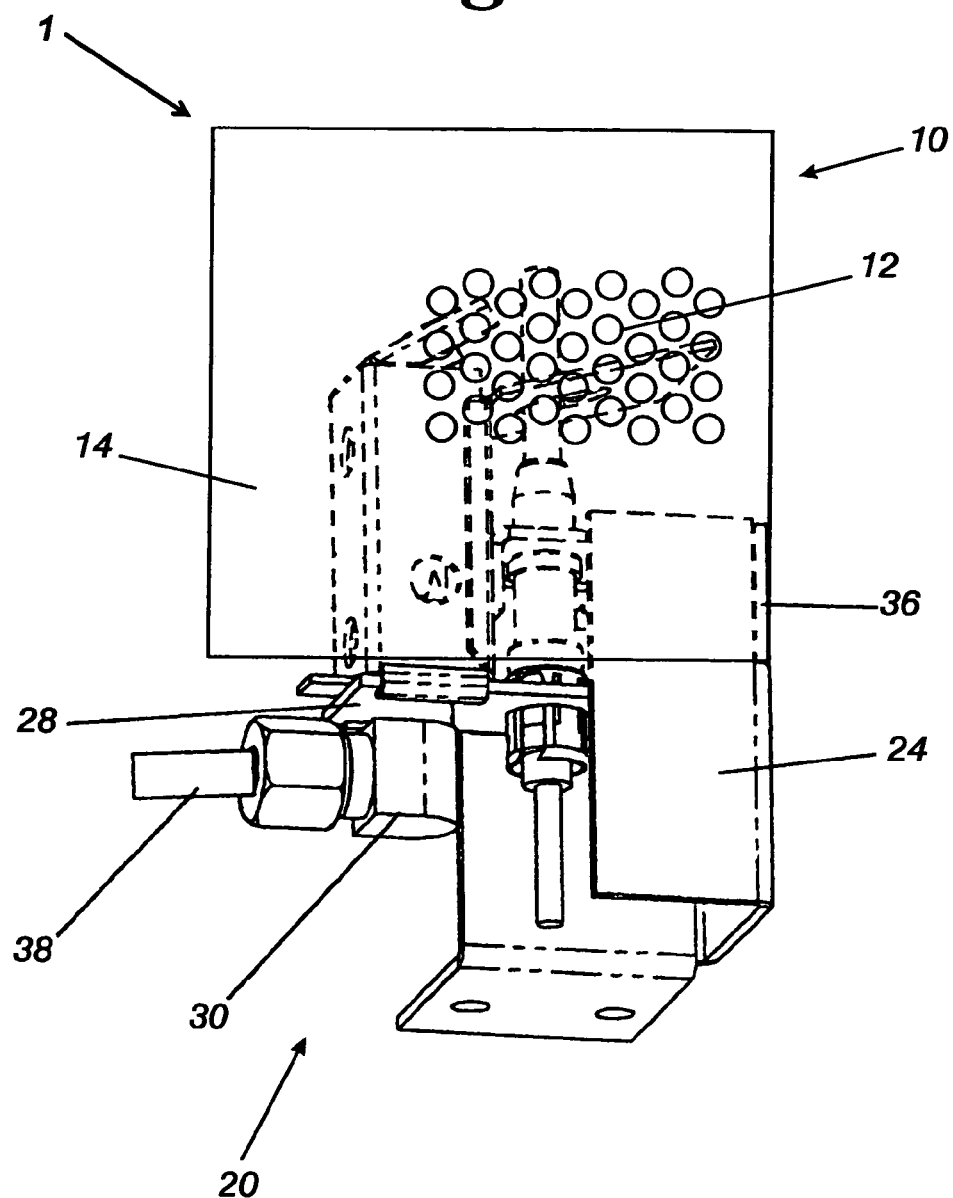
FIG. 5 is an enlarged, isometric view of the apparatus, wherein the windshield is seated on the pilot assembly.

The pilot assembly 20 is illustrated in FIG. 4. The pilot assembly 20 is comprised of an orifice jet (not shown), that is seated in an orifice holder 30, which is supplied fuel by the pilot light gas line 38. Burning fuel emanating from the orifice jet produces the pilot light flame 56. The vented pilot housing 26 is attached to the pilot light base 28. The top of the vented housing 26 has a flame deflector cap 27, which directs the flame 56 toward the thermocouple 22. Note, the flame substantially impinges the thermocouple 22. As shown in FIG. 4, the vented pilot housing provides wind protection for the pilot light. Another wind protection component of the pilot assembly 20 is a thermocouple restrictor plate 23, which shields the thermocouple from updrafts. The restrictor plate 23 diverts updrafts, which would cause the pilot light flame to be diverted away from the thermocouple, and possibly result in an errant signal causing the gas supply line to close. The vented pilot housing 26 has restrictor ports 29 and 34 that provide low flow velocity supply air for the pilot light orifice. The thermocouple 22, also mounted on the pilot base 28, is adjacent to the pilot light 56. As shown in FIG. 5, the apparatus 1, is comprised of the windshield 10 and the pilot assembly 20. The windshield 10 is held in position by slots 36, which are cut into corners of the pilot holder bracket 24. In FIG. 5, the shielded portion of the pilot assembly is shown in ghost with shadow lines to indicate that those components of the pilot assembly would not be visible.

Figure 7:
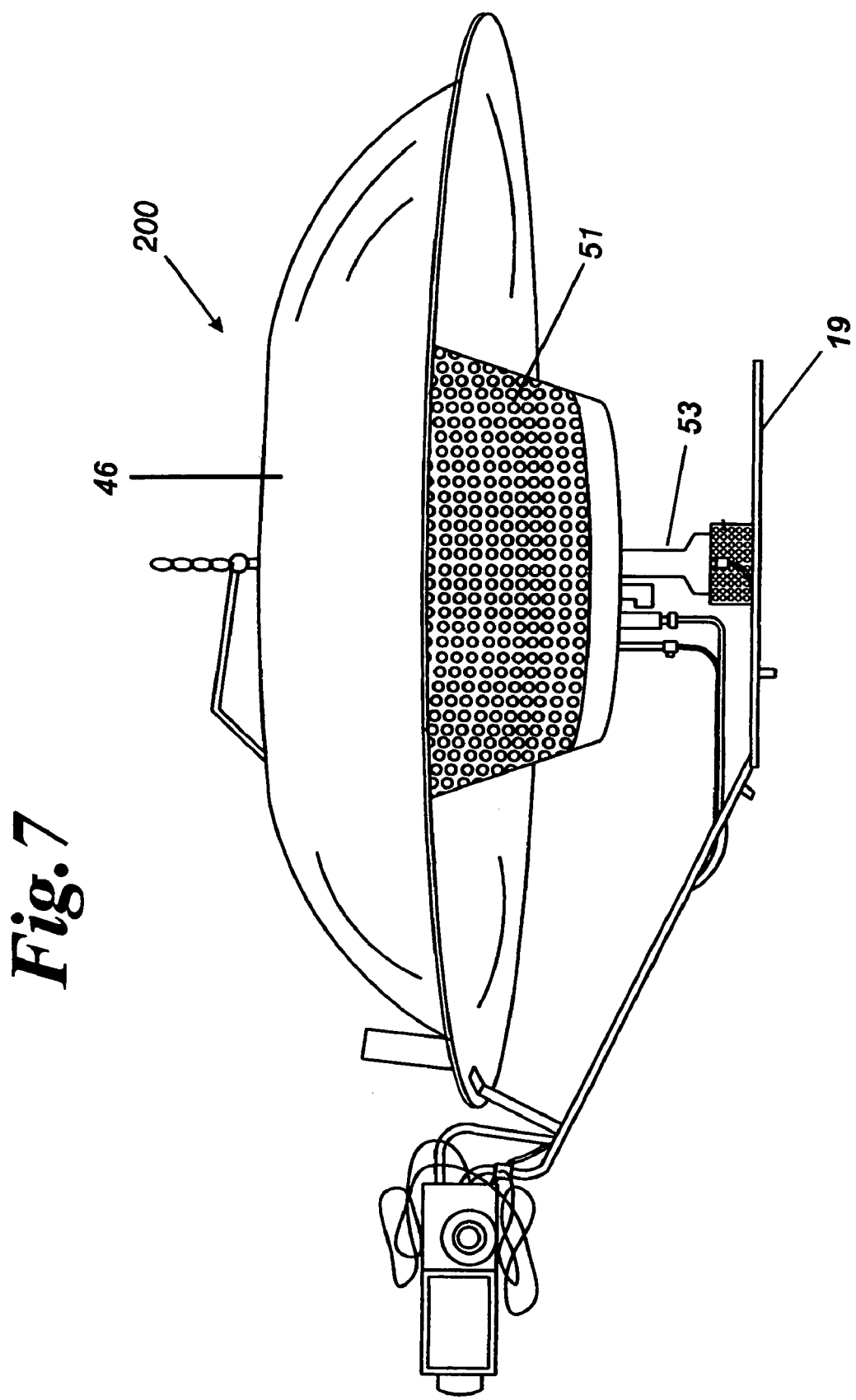
FIG. 7 is a perspective view of a poultry brooder heater having a radiant element.
Figure 8:
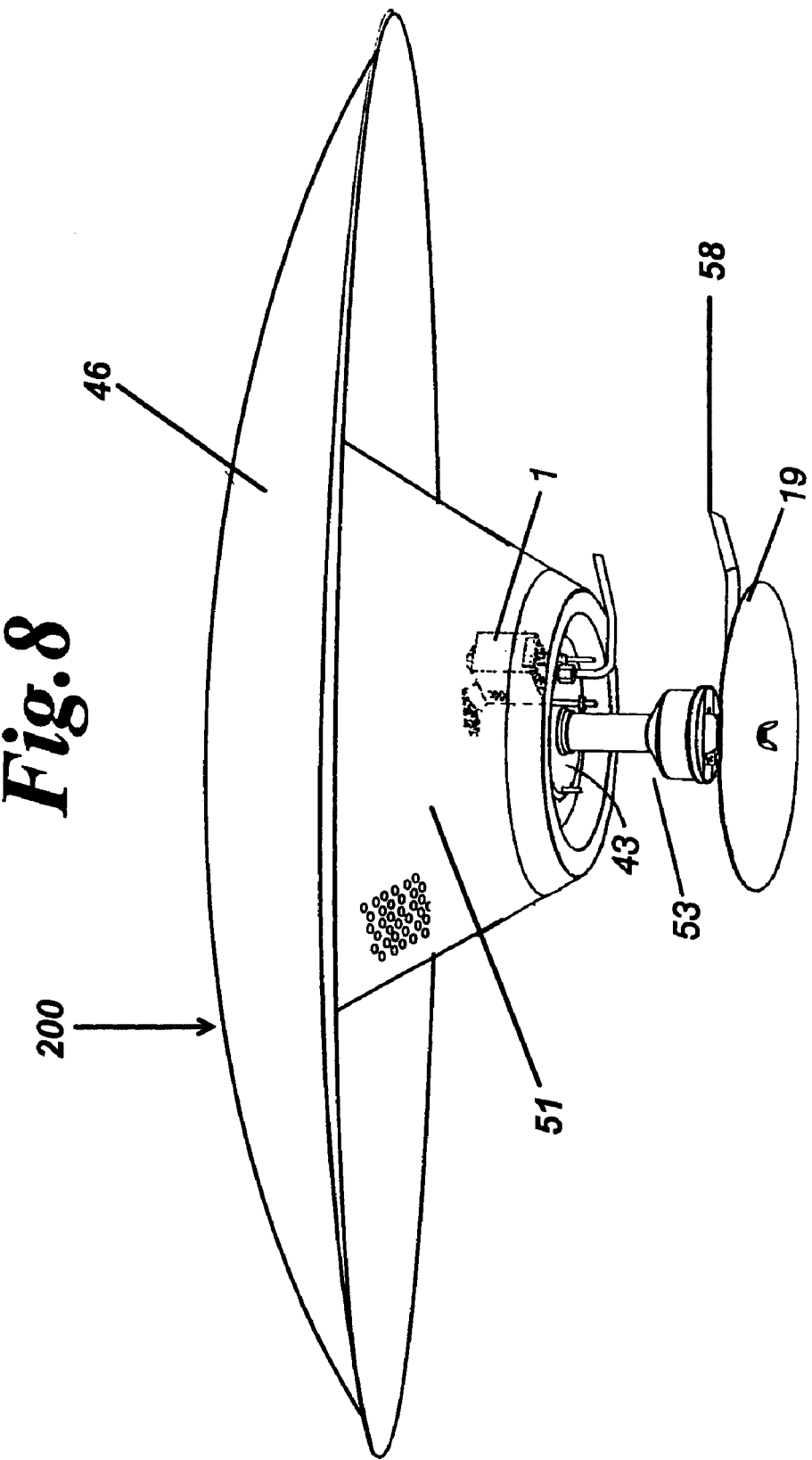
FIG. 8 is a partially exploded poultry brooder heater shown in FIG. 7 illustrating how the apparatus is mated with the heater having a radiant element.

FIG. 7 is a perspective view of radiant heater 200, wherein gases are combusted in a perforated stainless steel emitter chamber 51. The radiant heater 200 has an inner cone helps direct the burner flame toward the emitter chamber 51. The majority of the functional components of the apparatus 1 project into the perforated stainless steel emitter chamber 51. The emitter chamber is substantially frustoconical in shape. The apparatus 1 is mounted to a burner plate 43, as shown in FIG. 8. The emitter chamber 51 is open at the bottom. The apparatus, comprised of the pilot light assembly 20 and the windshield 10, are substantially the same as described for the ceramic element heater 100. The burner assembly 53 provides mixed combustion gases to the center of the emitter chamber 51. The burner pan 19 is suspended from the burner assembly 53.

FIG. 8 is a partially exploded poultry brooder heater shown in FIG. 7, illustrating how the apparatus is mounted. The apparatus 1 has an angled bracket 81, which positions the apparatus at the perimeter of the burner plate 43.

SUMMARY OF THE ACHIEVEMENT OF THE OBJECTS OF THE INVENTION

From the foregoing, it is readily apparent that I have invented an apparatus for brooder heaters having a ceramic or radiant element, where the synergistic combination of a windshield and a pilot light assembly enable a brooder heater to reliably operate in higher air flows. What is provided is a pilot light that is not extinguished, and a thermocouple that is protected and, therefore does not falsely detect that the pilot light is extinguished. The apparatus is more efficient in that a smaller pilot light flame can be used, thereby reducing fuel consumption. The apparatus is robust enough that it can be employed to ignite combustion gases in a radiant heater emitter chamber, and effective enough that it improves the reliability of both ceramic and radiant heaters, where both are known to be susceptible to malfunction in higher air flows.

What is claimed is:

1. An apparatus that provides reliable operation of a gas burner heater in high air flow conditions, wherein said apparatus comprises:
    a pilot light assembly comprising:
        a pilot light orifice for a pilot flame;
        a vented pilot housing with a flame deflector cap;
        a pilot light gas line;
        a thermocouple with connecting electrical leads;
        a mounting bracket; and
    a windshield, wherein said windshield is a partially perforated chamber having an open top and an open bottom, and at least one surrounding side wall, wherein the at least one surrounding side wall has a section that is partially perforated and a section that is solid; and
    wherein the windshield provides the pilot assembly a protected zone from crosswinds, against high velocity air infusion for both the pilot flame and for the thermocouple and against high air flow, and wherein the windshield is intersectingly engaged with the mounting bracket.

2. The apparatus as claimed in claim 1, wherein said flame deflector cap directs the pilot light toward the thermocouple.

3. The apparatus as claimed in claim 2, wherein said vented pilot housing has a thermocouple restrictor plate for restricting the flow of updrafts across the thermocouple.

4. The apparatus according to claim 1, wherein said pilot light assembly further comprises a pilot light base, which provides support for the vented pilot housing, the pilot light, and the thermocouple.

5. The apparatus as claimed in claim 1, wherein said gas burner heater is a poultry brooder with a conical ceramic element.

6. The apparatus as claimed in claim 1, wherein said gas burner is a poultry brooder having a radiant element.

7. The apparatus as claimed in claim 6, wherein said radiant element is a perforated stainless steel chamber.

8. The apparatus as claimed in claim 3, wherein said vented pilot housing has at least one restrictor port, where the at least one restrictor port that provides low flow velocity supply air to the pilot light.

9. The apparatus as claimed in claim 8, wherein said vented pilot housing requires no ignition portal for lighting the pilot light.

10. The apparatus as claimed in claim 9, wherein the pilot light can be ignited without removing the windshield.

11. The apparatus as claimed in claim 8, wherein the mounting bracket is slotted such that the windshield can be positioned by merely aligning the windshield with slots on the mounting bracket.

12. The apparatus as claimed in claim 3, wherein the pilot light stays lit in air flows of 7–9 mph, and the thermocouple stays sufficiently warm that it does not generate a false indication that the pilot light is extinguished, therein causing the gas to the gas burner heater to be shut off.

13. The apparatus as claimed in claim 5, wherein said pilot light assembly is mounted adjacent to a burner located under the conical ceramic element.

14. The apparatus as claimed in claim 7, wherein said pilot light assembly is mounted such that the pilot light is mounted in the radiant element.

15. The apparatus as claimed in claim 3, wherein said improved pilot light has high tolerance to variations in air flow, without an increase in the size of the pilot light flame.

16. The apparatus as claimed in claim 5, wherein the ceramic element brooder heater comprises:
    a ceramic heating element;
    a reflector;
    supports for the ceramic heating element;
    a burner; and
    a fuel supply line.

17. The apparatus as claimed in claim 6, wherein the radiant brooder heater comprises:
    an inner cone supporting a burner assembly;
    a burner plate;
    a perforated stainless steel emitter chamber;
    a reflector; and
    a fuel supply line.

18. The apparatus as claimed in claim 1, wherein the pilot light can be appropriately sized and combined in multiple pilot light assemblies with windshields to accommodate any size heater or bank of heaters.

19. The apparatus as claimed in claim 18, wherein said apparatus is suitable for all commercial fuels that can be gasified, such as natural gas, propane, butane and kerosene.

20. The apparatus as claimed in claim 1, wherein the apparatus enables the use of a small pilot light orifice, which reduces gas consumption by the pilot light.

21. The apparatus as claimed in claim 4, wherein the vented pilot housing can be removed by merely slid off the base, therein allowing quick access to the pilot light orifice for ease of cleaning.

22. The apparatus as claimed in claim 21, wherein the vented pilot housing has tabs that engage the base.

23. The apparatus as claimed in claim 1, wherein both the windshield and the vented pilot housing can be quickly removed providing quick access to the pilot light orifice for cleaning.

24. A windshield for a gas pilot light assembly, where said windshield comprises: a perforated chamber having an open top and an open bottom, and at least one surrounding side wall that provides a shield against crosswinds, wherein at least one surrounding side wall has a section that is partially perforated and a section that is solid, and where the chamber is sufficient in size to entirely shield said gas pilot light assembly, said gas pilot light assembly being comprised of a pilot light orifice for a pilot flame, a gas line, a vented pilot housing with a flame deflector cap, a thermocouple with electrical leads, and a mounting bracket for the gas pilot light assembly.

25. The windshield as claimed in claim 24, wherein the gas pilot light assembly is adaptable to a poultry brooder having a heating element comprised of a ceramic heating element, a reflector, supports for the heating element, a burner, and a fuel supply line;
   wherein the windshield ensures the proper operation of the gas pilot light assembly, and by derivation the proper operation of the burner.

26. The windshield as claimed in claim 24, wherein the gas pilot light assembly is adaptable to a poultry brooder having a radiant element comprised of a perforated stainless steel emitter chamber, an inner cone, a reflector, supports for the heating element, a burner, and a fuel supply line;
   wherein the windshield ensures the proper operation of the gas pilot light assembly, and by derivation the proper operation of the burner.

27. The windshield as claimed in claim 24, wherein the mounting bracket has slots for receivingly intersecting the windshield, and as such, the least one wall of the tubular chamber is a means for attaching said windshield to the mounting bracket.

28. The windshield as claimed in claim 25, wherein the pilot assembly is positioned beneath the ceramic element proximal to the burner.

29. The windshield as claimed in claim 26, wherein the pilot assembly is substantially positioned within the perforated stainless steel emitter chamber.

30. The windshield as claimed in claim 24, wherein the windshield provides protection against air flow that is in excess of 7 mph.

31. The windshield according to claim 24, wherein the gas pilot light assembly is further comprised of a restrictor plate for restricting the flow of updrafts across the thermocouple and guiding the pilot light flame so that it is directed at the thermocouple.

* * * * *